United States Patent
Kisch et al.

(10) Patent No.: US 12,451,767 B2
(45) Date of Patent: Oct. 21, 2025

(54) EXTERNAL ROTOR DEVICE HAVING INTEGRATED SENSOR SYSTEM, AND USE

(71) Applicant: ebm-papst St. Georgen GmbH & Co. KG, St. Georgen (DE)

(72) Inventors: Michael Kisch, St. Georgen (DE); Jens Löffler, Villingen-Schwenningen (DE); Marcus Hellmann, Unterkirnach (DE)

(73) Assignee: ebm-papst St. Georgen GmbH & Co. KG, St. Georgen (DE)

( * ) Notice: Subject to any disclaimer, the term of this patent is extended or adjusted under 35 U.S.C. 154(b) by 205 days.

(21) Appl. No.: 17/641,934

(22) PCT Filed: Sep. 11, 2020

(86) PCT No.: PCT/EP2020/075466
§ 371 (c)(1),
(2) Date: Mar. 10, 2022

(87) PCT Pub. No.: WO2021/048348
PCT Pub. Date: Mar. 18, 2021

(65) Prior Publication Data
US 2022/0360147 A1     Nov. 10, 2022

(30) Foreign Application Priority Data

Sep. 12, 2019   (DE) ................. 20 2019 105 035.7

(51) Int. Cl.
*H02K 11/215*    (2016.01)
*H02K 1/2791*    (2022.01)
(52) U.S. Cl.
CPC ......... *H02K 11/215* (2016.01); *H02K 1/2791* (2022.01)
(58) Field of Classification Search
CPC .. H02K 1/22; H02K 1/24; H02K 1/27; H02K 1/2786; H02K 1/2788; H02K 1/2789;
(Continued)

(56) References Cited

U.S. PATENT DOCUMENTS 7,562,542 B2 *  7/2009  Choi ................... H02K 1/2791
                                                    310/181
10,116,186 B2 * 10/2018 Kanai ................... H02K 11/00
(Continued)

FOREIGN PATENT DOCUMENTS

CN          1626720 A     6/2005
CN        108028587 A     5/2018
(Continued)

OTHER PUBLICATIONS

KR20190086084A_Translation (Year: 2024).*

*Primary Examiner* — Maged M Almawri
*Assistant Examiner* — Ahmed F Seck
(74) *Attorney, Agent, or Firm* — The Webb Law Firm (57) ABSTRACT

The invention relates to an external rotor device with a rotor housing designed to receive at least one rotor and with at least one sensor magnet provided on the rotor housing. The sensor magnet is arranged/can be arranged in sensory correlation with and in a predefinable relative position relative to the rotor. According to the invention, the external rotor device is characterised in that the external rotor device has at least one ring which is integrally formed on the rotor housing, the ring having at least one pocket which is arranged to receive the sensor magnet, the sensor magnet being arranged/arrangeable in the pocket in such a way and the ring being arranged/arrangeable in a predefinable relative position relative to the rotor on/in the rotor housing in such a way that the relative position of the sensor magnet relative to the rotor in at least one spatial direction is predefined by the materially integral formation, in particular at least with regard to the radial direction and also with regard to the circumferential direction and/or the axial direction.

18 Claims, 3 Drawing Sheets

(58) Field of Classification Search
CPC ............ H02K 1/279; H02K 5/02; H02K 5/04;
H02K 1/2791; H02K 29/06; H02K 29/08;
H02K 29/14; H02K 1/28; H02K 5/08;
H02K 5/26; H02K 11/04; H02K 11/33;
H02K 11/20; H02K 11/21; H02K 11/215
See application file for complete search history.

(56) References Cited

U.S. PATENT DOCUMENTS

| | | |
|---|---|---|
| 10,451,072 B2 | 10/2019 | Aso et al. |
| 2004/0095029 A1* | 5/2004 | Ewert ................... H02K 15/14 |
| | | 310/89 |
| 2005/0126230 A1 | 6/2005 | Choi |
| 2010/0090547 A1* | 4/2010 | Yano ..................... H02K 5/08 |
| | | 310/43 |
| 2017/0033647 A1 | 2/2017 | Aso et al. |
| 2018/0231778 A1* | 8/2018 | Yoon ..................... G02B 3/08 |
| 2019/0028009 A1 | 1/2019 | Shimokawa et al. |

FOREIGN PATENT DOCUMENTS

| | | | | |
|---|---|---|---|---|
| EP | 1541739 B1 | 4/2012 | | |
| EP | 2811168 A1 | 12/2014 | | |
| JP | S58179150 A | 10/1983 | | |
| JP | S6188480 A | 5/1986 | | |
| JP | 1175356 A | 3/1999 | | |
| JP | 200078821 A | 3/2000 | | |
| KR | 1020050056363 A | 6/2005 | | |
| KR | 20190086084 A * | 7/2019 | ............... | H02K 1/02 |

\* cited by examiner

EXTERNAL ROTOR DEVICE HAVING INTEGRATED SENSOR SYSTEM, AND USE

CROSS-REFERENCE TO RELATED APPLICATIONS

This application is the United States national phase of International Application No. PCT/EP2020/075466 filed Sep. 11, 2020, and claims priority to German Patent Application No. 20 2019 105 035.7 filed Sep. 12, 2019, the disclosures of which are hereby incorporated by reference in their entirety.

BACKGROUND OF THE INVENTION

Field of the Invention

The present disclosure relates to an external rotor device with a rotor housing for at least one rotor and with at least one sensor magnet provided on the rotor housing, wherein the sensor magnet can be arranged in sensory correlation and in a predefinable relative position relative to the rotor. In particular, the disclosure relates to a device for the particularly advantageous arrangement or alignment of sensor magnets relative to the rotor or rotor housing. Last but not least, the present disclosure also relates to the use of an additional housing component for integrating sensor technology into the housing.

Description of Related Art

In many rotating devices with a rotor, it is advantageous to integrate sensors. For example, in the case of external rotor rotors (external rotor design of rotating electrical machines), it can be very advantageous if sensors are provided which, e.g. by means of a magnetic field, enable the monitoring of operating parameters and/or the generation of measured values. In particular, it has already been tested to glue the sensors to the outer casing of rotors with index magnets or similar sensors. Not least because of the applied measurement technology, it is desirable to be able to position the respective sensor as precisely as possible and also robustly on the housing.

Based on this state of the art, there is interest in an improved or more expedient implementation of sensor technology, in particular of sensor magnets in or on rotating electrical machines, in particular on external rotor rotors or their housings.

SUMMARY OF THE INVENTION

The present disclosure provides a device with which sensors, in particular sensor magnets, can be fixed to rotors, in particular external rotor rotors, in a particularly expedient manner. In particular, the present disclosure provides an external rotor device with integrated magnetic sensors in such a way that the sensors can be aligned and/or positioned particularly precisely, especially relative to bores in the rotor housing.

Provided is an external rotor rotor device having a rotor housing arranged to receive at least one rotor and having at least one sensor magnet provided on the rotor housing, the sensor magnet being arranged/arrangeable in sensory correlation with and in predefinable relative position relative to the rotor.

According to the disclosure, it is proposed that the external rotor device has at least one ring which is integrally formed on the rotor housing, the ring having at least one pocket (sensor cavity) which is designed to receive the sensor magnet, the sensor magnet being arranged/arrangeable in the pocket in such a way and the ring being arranged/arrangeable in a predefinable relative position relative to the rotor on/in the rotor housing in such a way that the relative position of the sensor magnet relative to the rotor in at least one spatial direction is predefined by the material-locking formation, in particular at least with regard to the radial direction and also with regard to the circumferential direction and/or the axial direction.

This enables a particularly advantageous way of attaching sensor magnets to the outer circumference of rotor housings, especially also for housings of external rotor rotors. In particular, the sensor technology can be integrated in a particularly precise and robust manner. By means of the pocket, the relative radial position and also the orientation of the sensor system (especially the north-south axis) can be defined in a comparatively exact and reproducible manner. Last but not least, cost advantages can also be realised. Any assembly tolerances can be minimised.

The position of the rotor may be predefined by the rotor housing, in particular via at least one bore defining an axis of rotation. A relative orientation and arrangement relative to the housing can therefore imply a relative orientation and arrangement relative to the rotor, and vice versa.

The disclosure is based on the concept of integrating sensors into the housing without having to modify the housing. Rather, the sensor technology can be integrated (or can be integrated) into an initially separate ring, which is connected to the housing, preferably by moulding, preferably without the use of any adhesives. This provides the possibility, especially in the case of separate supply chains or manufacturing processes, to provide the sensor together with the ring on the one hand, and to provide the housing on the other hand, in order to then combine both components (especially in the sense of a "marriage" as in automobile manufacturing) at the end of the manufacturing process. The sensor technology is preferably integrated on the outside of the housing. This arrangement also facilitates the implementation of an injection molding process.

In contrast, it was previously common to glue the sensor technology to the outside of the housing, with corresponding disadvantages in terms of accuracy, reproducibility, durability, robustness and similar requirements. A pocket or cavity to hold the sensor was not provided. The sensor is correspondingly disadvantageously arranged in an exposed position in this design.

An external rotor device is generally understood to be a rotating electrical machine with an external rotor (stator further inside than rotor). In particular, an external rotor is to be understood as a design of rotating electrical machines (especially generators or electric motors) in which the stationary part (stator) is located on the inside of the moving part (rotor). Examples of applications include commutated DC motors or asynchronous motors with squirrel-cage rotors, which are used, for example, as axial fans, dynamos, ceiling fans, gyro motors, direct drives for computer hardware or the like.

As a sensor technology, the sensor magnet technology is mentioned as an example. The disclosure is transferable to other sensor technologies. In particular, the pocket can also be designed for a largely arbitrary other sensor, be it with regard to its size and geometry, be it with regard to its relative arrangement to the rotor or to the housing.

It has also been shown that the disclosure can expand the range of applications for rotor devices. In particular, the sensor technology or its integration is less sensitive to temperature fluctuations or ageing effects or external influences such as UV radiation. For example, the use of adhesives can be completely dispensed with. Detachment of the sensor from the housing can be ruled out with a very high degree of certainty.

In contrast to previously proven technologies, the present disclosure also enables a very precise alignment of the sensor magnet in the axial and radial direction (in particular also with respect to a north-south axis of the magnet), especially relative to bores of the housing. This also favours a robust and operationally reliable overall arrangement that can be optimised in terms of control/regulation over a long period of use.

It has been shown that the integration of the sensor system into the rotor housing can be particularly advantageously ensured by means of a ring geometry for the additional (housing) component, for example with regard to an already predetermined cylindrical geometry of the rotor housing. In deviation from the ring shape, the skilled person can also invent or use other shapes for this additional (housing) component, by means of which the sensor technology can also be provided in a pocket or similar cavity, and by means of which a material-locking moulding or integral connection of the two housing components (rotor housing and ring or equivalent additional components) can be realised in a comparable manner. In this respect, the term "ring" is not to be understood as geometrically limiting, but rather as exemplary in the case described for an at least approximately cylindrical housing.

According to one embodiment, the ring has an inner circumferential surface by means of which the ring is molded onto an outer circumferential surface of the rotor case. Such an interface also provides the advantage of high dimensional accuracy, especially with cylindrical surfaces or with very slightly conically inclined surfaces.

The ring and the rotor case can have geometrically corresponding circumferential surfaces, by means of which a material-locking interface is provided, in particular completely.

According to an embodiment example, a material-locking interface is defined between the ring and the rotor case, in particular fully circumferentially, at which the material lock between the ring and the rotor case is ensured, in particular at mutually fully contacting shell surfaces. This also provides good robustness and a tight fit or a good, resilient connection at this interface.

A material interface can be defined between the ring and the rotor housing, which is set up for material closure by injection molding or gating, whereby the material interface is defined on an outer side of the rotor housing. Particularly in the case of injection molding, large quantities can also be produced in a short time, especially with cost advantages.

The external rotor device is set up to integrate the sensor system into the housing by adding a further housing component (ring) without having to modify the housing for this purpose. Rather, the sensor system can be integrated (or subsequently integrated) into an initially separate ring (or geometrically different alternative component with the same integration functionality), which is connected to the housing, preferably by molding, preferably without the use of any adhesives.

The ring and the rotor housing can have geometrically corresponding lateral surfaces, by means of which a full material interface is provided, which has a maximum degree of separation of 0.1. This arrangement favors not least an indirect positioning of the sensor system. The degree of mould separation can refer specifically to the two housing components. On the rotor case, for example, a surface for the interface can be defined at a lower edge, and the ring is connected to the rotor case, for example, in the same plane as the lower edge of the rotor case. Only the circumferential position needs to be adjusted. The height position can therefore already be predefined by the geometry of the housing.

According to one embodiment, the external rotor device is set up to integrate the sensor system into the rotor housing by adding another housing component (in particular with ring geometry or similar corresponding geometry), in particular provided by the ring. This not only simplifies the alignment, but also the attachment of the sensor system. The disclosure is also based on the concept of providing a much larger mounting interface by means of the additional housing component (ring) than would be possible via the sensor alone.

According to one embodiment, the ring is molded onto the rotor case by injection molding. This also enables a large-area interface and a comparatively robust connection in combination with good angular fidelity and flat alignment, especially if the ring also co-defines the underside of the housing.

The ring/additional housing component can be materially bonded to the rotor case without any additional material bonding component, in particular without adhesive or glue, in particular involving only the material(s) of the ring and the rotor case. This provides a robust interface and can also maximise long-term service life and operational reliability.

In particular, the ring can be fully joined to the rotor case by a primary molding process.

In particular, the ring can be physically (non-chemically) connected to the rotor case, i.e. without chemical reaction, and without additional chemical connecting means.

For example, the ring can be connected to the rotor case by plasticising the material of the ring and/or rotor case, in particular by applying pressure.

According to an embodiment example, the rotor housing has at least one bore, in particular a bore arranged in an end-face surface section of the rotor housing, wherein the pocket or the sensor magnet is arranged in radial alignment with the at least one bore. This also favors an exact and metrologically optimised integration of the sensor technology.

According to one embodiment, the pocket encloses the sensor magnet on at least four or five sides, in the sense of a perimeter or partition. This also provides good protection against external influences. The pocket can also be used to align the sensor comparatively precisely. The inner geometry of the pocket can be designed geometrically and also in terms of dimensions to correspond to the sensor magnet, in particular in the sense of a negative shape. Thus, the sensor can be embedded in the pocket and thus also be very well supported. Alignment tolerances can be minimised.

For example, the pocket encloses the sensor magnet on five sides, whereby the sixth side (in particular the underside of the ring or rotor housing) is a side subsequently sealed after the ring has been formed, in particular a side sealed by ultrasonic welding and/or hot stamping. Such a design makes it possible to hermetically seal the sensor system by means of a comparatively small, simple post-processing step. In addition, the option remains to select or implement the sensor technology only after moulding and inserting it into the pocket. This provides further process-related and technical variation possibilities, not least thanks to a very flexible process.

According to an embodiment example, the rotor housing and/or the ring (additional housing component) are made of plastic material. This can also allow easy application of the advantageous manufacturing steps described here. Optionally, the rotor case and the ring are made of the same material.

The aforementioned task is also solved in particular by using an additional housing component, in particular in the form of a ring, in an external rotor device, in particular in an external rotor device described above, for providing a receiving cavity (pocket) for sensor technology integrated in a rotor housing of the external rotor device, in particular for at least one sensor magnet, wherein the additional housing component is set up for a primary molding process for the material-locking moulding of the housing component on the rotor housing with the receiving cavity in a predefinable relative position relative to the rotor housing, in particular is set up for a molding-on process, and is provided in the form of a solid housing component made of plastic material. This results in the advantages mentioned above. In particular, an exact relative positioning and also a robust way of fastening the sensor system can be ensured. The additional housing component becomes part of the rotor housing, in particular by forming a collar of the rotor housing.

The additional housing component can be integrated into the housing or molded onto the housing, in particular by means of an original molding process in the form of an injection process.

The aforementioned task is also solved in particular by an external rotor device with a rotor housing arranged to receive at least one rotor and with at least one sensor magnet provided on the rotor housing, the sensor magnet being arranged/arrangeable in sensory correlation with and in a predefinable relative position relative to the rotor, the external rotor device having at least one ring, which is integrally formed on the rotor housing, the ring having at least one pocket which is set up to receive the sensor magnet, the sensor magnet being arranged/arrangeable in the pocket in such a way and the ring being arranged/arrangeable in a predefinable relative position relative to the rotor on/in the rotor housing in such a way that the relative position of the sensor magnet is in sensory correlation with and in a predefinable relative position relative to the rotor, in that the relative position of the sensor magnet relative to the rotor in at least one spatial direction is predefined by the material-locking formation, in particular at least with respect to the radial direction and also with respect to the circumferential direction and/or the axial direction, the ring and the rotor housing having geometrically corresponding lateral surfaces, by means of which a/the material-locking interface is provided, in particular completely, wherein the ring is connected to the rotor housing in a material-locking manner without an additional material-locking component, in particular without adhesive or glue, in particular only with the inclusion of the material or materials of the ring. The substances or materials of the ring and the rotor housing, wherein the ring is materially bonded to the rotor housing by a primary molding process, are provided from the following group: thermoset injection molding, elastomer injection molding, multi-component injection molding, in-mold injection molding, hot embossing or injection compression molding or swelling flow embossing, powder injection molding, and extrusion injection molding. This results in numerous previously mentioned advantages. In particular, the additional housing component or ring can be connected to the housing in a particularly reliable, exact and operationally safe manner, thereby positioning or implementing the sensor technology within a very narrow tolerance range.

The above-mentioned task is also solved by an external rotor device with sensors integrated in the rotor housing, in particular by an external rotor device described above, produced by forming an additional housing component in the form of a ring with at least one pocket (receiving cavity) for the sensors, in particular sensor magnet, to the rotor housing and thereby forming an integral housing part at least from the rotor housing and the ring, in particular by connecting the ring to an outer circumferential surface of the rotor housing by primary molding in the form of injection molding (in particular by so-called "injection molding"). This results in the advantages mentioned above. In particular, a standardisable procedure with very good reproducibility can be realised with closely pre-definable process parameters and also for high quantities. The process can also be carried out largely independently of the type of sensor to be provided in the pocket, in particular because the additional housing component (ring) can be customised in advance for the respective sensor and can be provided individually without influencing the design of the material-fit interface.

The pocket can also be individually optimised for a particular application in a relative position within the ring (for example, as far radially inwards as possible for a short measuring distance to the rotor), not least thanks to a solid design of the ring. If/when a sensor magnet is inserted into the pocket can be determined individually for a particular application. For example, the sensor magnet is inserted into the pocket after the ring has been molded or injected, and the pocket is then sealed, in particular hermetically sealed in all spatial directions (whereby preferably only one side of the pocket, in particular the underside, needs to be sealed).

The ring, which is attached to the rotor housing in a materially bonded manner, can form a collar of the housing, in particular at the lower edge of the housing.

According to one embodiment, the pocket is sealed after insertion of the sensor or sensor magnet, in particular by using ultrasonic welding and/or hot stamping. This process step can optionally be carried out in combination with the initial molding or injection, optionally also independently of it. The closing of the pocket, in particular on an underside of the pocket, can optionally also be carried out by other processes. In particular, if the sensor magnet is already geometrically predefined positioned in the pocket (e.g. geometry of the pocket requires alignment of the sensor magnet in predefined direction), the sealing merely serves to seal off the pocket, and possibly to avoid loss of the sensor magnet, so that the person skilled in the art can select the method for sealing the pocket largely freely and individually for a particular application. The method of closing also depends on if/when the sensor magnet is/will be placed in the pocket. The closing of the pocket can optionally also provide a reversible closure, in particular if the pocket is to remain accessible as required.

In contrast, a rotor device with an index magnet has so far been manufactured by the following process, for example:

Magnet (singular or plural) and housing are wetted with activator;

The at least one magnet is positioned or fixed by means of a device;

the device is carefully removed, especially so as not to affect the desired relative position of the magnet relative to the circumferential surface;

the at least one magnet (e.g. cuboid magnet) is glued to the circumferential surface;

UV light, for example, can be used for curing.

However, such an approach may have the disadvantage that the sensor magnet cannot be positioned exactly, that the attachment requires comparatively much time, and/or that the optimal process parameters are not maintained during bonding and curing, e.g. due to temperature and/or humidity fluctuations.

The aforementioned task is also solved by a method for producing an external rotor device with sensor technology integrated into the housing, in particular an external rotor device described above, wherein at least one sensor magnet is arranged on a rotor housing for receiving at least one rotor of the external rotor device in sensory correlation with the rotor and in a predefinable relative position relative to the rotor, at least one additional housing component, in particular in the form of a ring, being integrally formed on the rotor housing, the additional housing component having at least one pocket in which the sensor magnet is accommodated or can be accommodated, the additional housing component (and thus also the pocket) being arranged in a predefinable relative position relative to the rotor on/in the rotor housing by the forming in such a way that the relative position of the pocket or of the sensor magnet relative to the rotor is predefined. The sensor magnet relative to the rotor in at least one spatial direction is predefined by the material-locking molding, in particular at least with regard to the radial direction and also with regard to the circumferential direction and/or the axial direction. This results in the advantages mentioned above.

The molding can be carried out in particular by one of the following processes: thermoset injection molding, elastomer injection molding, multi-component injection molding, in-mold injection molding, hot embossing or injection compression molding or swelling flow embossing, powder injection molding, and extrusion injection molding.

According to one embodiment, the process also comprises inserting the sensor magnet and/or closing the pocket, in particular by ultrasonic welding and/or hot stamping.

BRIEF DESCRIPTION OF THE DRAWINGS

The disclosure is described in further detail in the following drawing figures, with reference being made to the other drawing figures for reference signs that are not explicitly described in a respective drawing figure.

DESCRIPTION OF THE DISCLOSURE

Figure 1A:
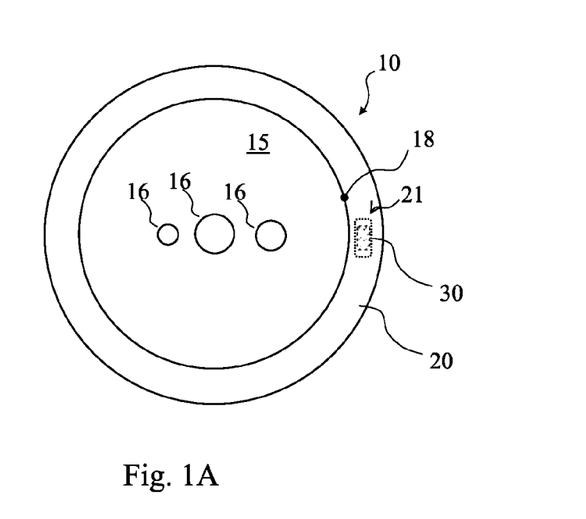
FIGS. 1A and 1B area top view and a side view schematic representation of an external rotor rotor device according to an embodiment example.
Figure 1B:
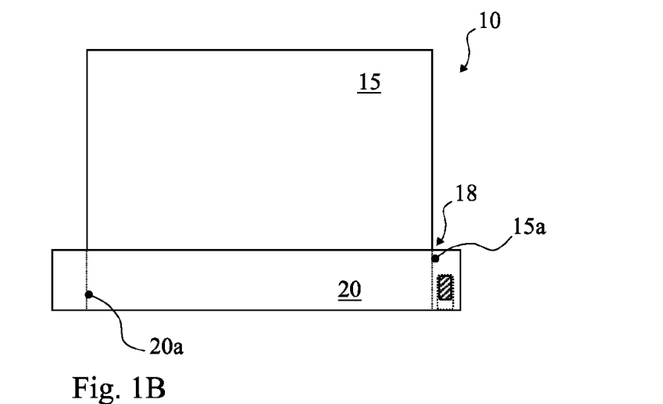

In FIGS. 1A, 1B, a first embodiment of an external rotor rotor device 10 is illustrated in a schematic manner, whereby a rotor or an external rotor is not explicitly shown. The rotor housing 15 is rotationally symmetrical, with an at least approximately cylindrical outer circumferential surface. Three bores 16 are provided in the housing 15 on its upper end face: one at least approximately central bore 16 and two relatively smaller bores arranged radially therefrom, in particular in alignment radially with one another. The number of bores is chosen as an example. The bores 16 can, for example, assume a function for the arrangement of a rotor and/or external rotor. The bores 16 are all provided, for example, in a section of the lateral surface of the housing 15 provided on the front side and are designed, for example, as through bores and/or blind bores.

A ring 20 (additional housing component) is molded onto the housing 15. The fastening is ensured via a material-locking interface 18, at which an inner lateral surface 20a of the ring 20 and an outer lateral surface 15a of the housing 15 contact each other. Preferably, the material-locking interface 18 is provided in its entirety. Both surface sections 15a, 20a are at least approximately cylindrical, possibly also slightly conical, and are geometrically designed to correspond to each other.

A pocket or cavity 21 is provided in the ring in which a sensor magnet 30 (or alternative sensor technology) is accommodated. The pocket 21 or the sensor magnet 30 is radially aligned with all three holes 16. In this example, the pocket 21 is provided comparatively far radially inside the ring. The pocket 21 defines an enclosure for the sensor magnet 30 on five of six sides, and on the sixth side (here: underside or front lower side) the pocket can be closed after insertion of the sensor (with reversibly removable sensor, or also irreversibly by materially sealing off).

In FIG. 1B, the mutually contacting or fused or joined lateral surfaces 15a, 20a are identified with reference to the dotted line (which is intended to symbolise the material interface 18).

Figure 2A:
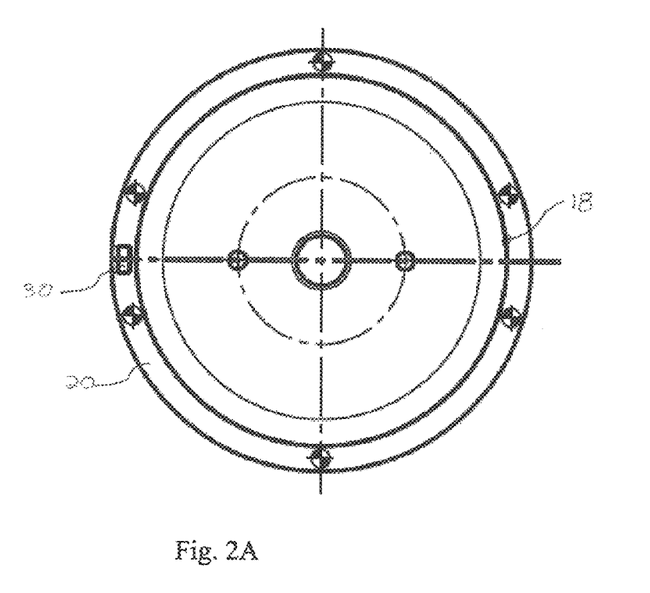
FIGS. 2A and 2B are a top view and in a side view cut along the semicenter axis indicated in FIG. 2A, an external rotor rotor device according to a further example of an embodiment.
Figure 2B:
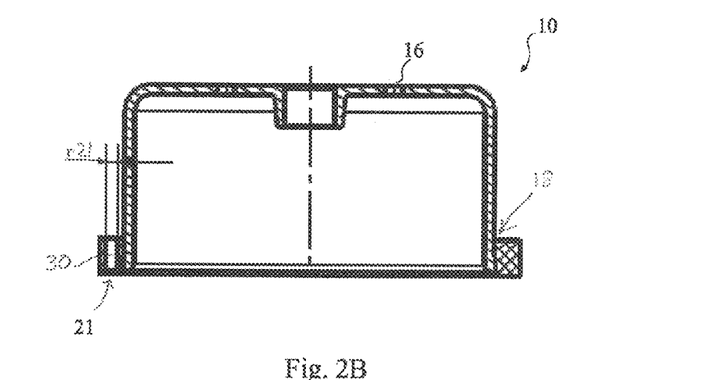

In FIGS. 2A, 2B, a further embodiment is shown in which the external rotor rotor device 10 has an integral pocket 21 which can be provided by molding the ring 20 to the rotor housing 15 in an integral (preferably one-piece) housing component. This allows the sensor assembly to be secured for particularly reliable operation and also to be positioned and aligned in a comparatively accurate manner. The ring 20 forms a collar of the housing after injection molding. This can facilitate relative positioning. Optionally, the ring 20 can also take over other housing functions, for example a fastening function for the entire housing (as indicated by the holes in FIG. 2A). This functional integration in the additional housing part allows further variations and can also favour an advantageous relative position of the sensor system, especially in the radial direction.

The pocket 21 has an at least approximately rectangular cross-sectional geometry. The radial extension r21 is e.g. in the range of 30 to 70% of the radial thickness of the ring 20. The pocket 21 is integrated into the ring at least approximately radially centrally with respect to the radial extension (radial thickness) of the ring 20. The ring 20 is preferably designed as a solid component made of solid material, for example plastic. The rotor housing 15 or at least its outer side can also be made of plastic.

The three holes 16 are at least approximately aligned. The sensor magnet 30 is at least approximately aligned with the holes 16. The pocket 21 is at least approximately aligned with the holes 16. The three holes 16 are arranged in radial alignment with the pocket. The ring 20 enables a comparatively exact relative arrangement or alignment, on the one hand with respect to the circumferential position, and on the other hand also with respect to the height position (in particular flat plane underside of the housing 15, defined both by the lower end face of the ring 20 and by the lower end face of the housing 15).

FIG. 2B shows in detail the relative arrangement of the ring 20 relative to the rotor case 15: Towards the bottom of the housing opening (i.e. in the axial direction), the ring 20 slightly overlaps the housing edge; this can be useful, for example, with regard to a mounting interface for the entire housing 15, especially if the mounting interface is to be defined as far as possible solely by the underside of the ring 20.

In particular for an application in the field of pump or fan technology, the dimensions of the housing 15 including the molded-on ring 20 are, for example:

Outer diameter (outer sheath surface) approx. 30 to 50 mm;
radial extension of the ring 20 approx. 2 to 5 mm;
Outer diameter of the ring approx. 35 to 60 mm;
Diameter of the smaller holes 16 approx. 1.5 to 2.5 mm;
radial extension of the pocket 21 approx. 1 to 4 mm; and
Circumferential extension of the pocket 21 approx. 2 to 6 mm;

In FIG. 2B, a plane E of the mold separation is also indicated. For the interface 18, for example, a permissible degree of mold separation of a maximum of 0.1 can be defined (in particular in relation to the other millimeter or size specifications available). Position and size tolerances can also be defined in particular according to DIN ISO 2768 and/or ISO 14405. Non-measured draft angles are e.g. in the range of 0.5 to 1.5°, in particular approx. 1°.

Figure 3A:
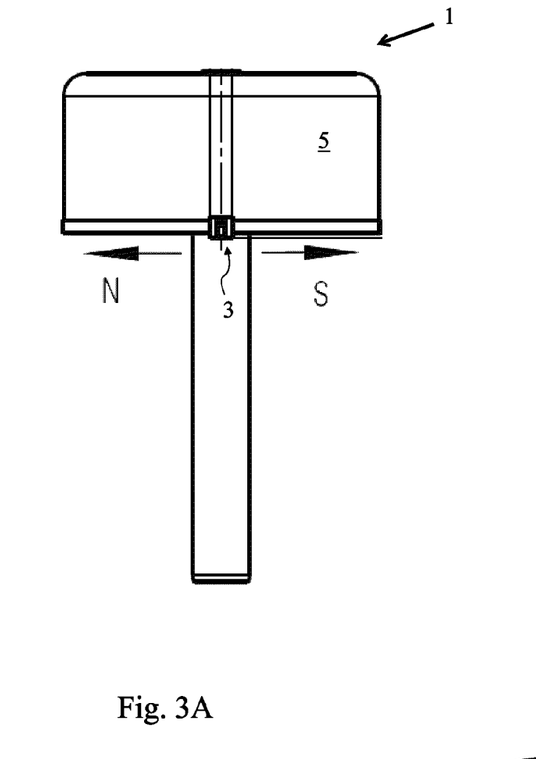
FIGS. 3A, 3B and 3C are side views of an external rotor rotor according to the state of the art.
Figure 3B:
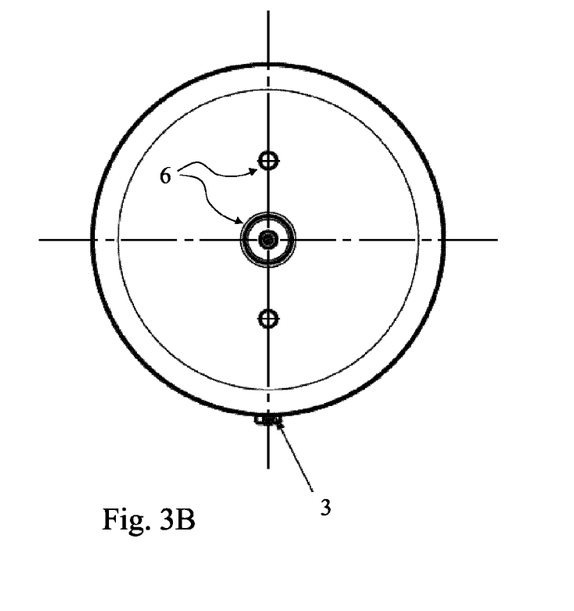
Figure 3C:
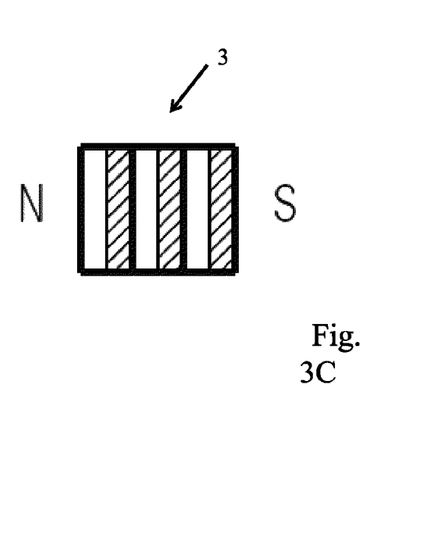

FIGS. 3A, 3B, 3C show an example of an external rotor 1 with a housing 5 with bores 6 according to the state of the art, with a sensor attached or glued to the outside of the housing surface. The sensor magnet 3 is provided on the outside of the housing 5 and protrudes from the housing in a radial direction, thus creating a radial unevenness or protrusion. The relative positioning of the sensor magnet 3 relative to other components of the external rotor 1 is comparatively difficult or remains comparatively inaccurate (disadvantageously high position tolerances or also assembly errors). This arrangement and mounting of the sensor magnet 3 is also rather disadvantageous, for example, with regard to contact or collision with objects or stripping by any colliding components.

FIG. 3C illustrates in enlarged scale the north-south (N-S) orientation of the sensor magnet 3.

LIST OF REFERENCE SIGNS

1 External rotor according to the state of the art
3 Sensor magnet for standard housing
5 Rotor housing according to the state of the art
6 Borehole
10 External rotor rotor device
15 Rotor case
15a Outer shell surface
16 Borehole
16 Material interface or contact surface
18 Ring or collar, especially plastic ring
20a Inner surface area
21 Pocket or cavity in the ring
30 Sensor or sensor system, in particular sensor magnet
E—Level of mold separation
N North
S South
r21 Radial extension of the pocket

The invention claimed is:

1. An external rotor device having a rotor housing adapted to receive at least one rotor and having at least one sensor magnet provided on the rotor housing, the at least one sensor magnet being arranged in sensory correlation with and in a predefined relative position relative to the at least one rotor, wherein the external rotor device has at least one ring which is integrally formed on the rotor housing, wherein the at least one ring has at least one pocket, which is set up to receive the at least one sensor magnet, the at least one sensor magnet being arranged in the at least one pocket, and the at least one ring being arranged in a predefined relative position relative to the at least one rotor on or in the rotor housing in such a way in that the relative position of the at least one sensor magnet relative to the at least one rotor in at least one spatial direction is predefined by a materially interlocking formation, at least with regard to a radial direction and also with regard to a circumferential direction and/or an axial direction, the at least one ring and the rotor housing having geometrically corresponding circumferential surfaces, by means of which a fully circumferential materially interlocking interface is provided which has a maximum degree of mold separation of 0.1, wherein the at least one ring has an inner circumferential surface by means of which the at least one ring is integrally formed on an outer circumferential surface of the rotor housing with all of the inner circumferential surface of the at least one ring in contact with the outer circumferential surface of the rotor housing, and wherein the at least one ring and the rotor housing have the geometrically corresponding circumferential surfaces, by means of which a fully circumferentially materially interlocking interface is provided.

2. The external rotor device according to claim 1, wherein a material-locking interface is defined between the at least one ring and the rotor housing, at which a material lock between the at least one ring and the rotor housing is ensured.

3. The external rotor device according to claim 1, wherein a material interface is defined between the at least one ring and the rotor housing, which is adapted for material closure by injection molding or gating, wherein the material interface is defined on an outer side of the rotor housing.

4. The external rotor device according to claim 1, wherein the external rotor device is arranged to integrate a sensor system or the at least one sensor magnet into the rotor housing by adding a further housing component.

5. The external rotor device according to claim 1, wherein the at least one ring is integrally formed on the rotor housing by injection molding.

6. The external rotor device according to claim 1, wherein the at least one ring is connected to the rotor housing in a substance-to-substance bond without an additional substance-to-substance component.

7. The external rotor device according to claim 1, wherein the at least one ring is materially connected to the rotor housing by a primary molding process.

8. The external rotor device according to claim 1, wherein the at least one ring is physically connected to the rotor housing.

9. The external rotor device according to claim 1, wherein the at least one ring is connected to the rotor housing by plasticizing material of the at least one ring and/or the rotor housing.

10. The external rotor device according to claim 1, wherein the at least one ring is bonded to the rotor housing by a primary molding process selected from the group consisting of: thermoset injection molding, elastomer injection molding, multi-component injection molding, in-mold injection molding, hot embossing or injection compression molding or swelling flow embossing, powder injection molding, and extrusion injection molding.

11. The external rotor device according to claim 1, wherein the rotor housing has at least one bore, wherein the at least one pocket or the at least one sensor magnet is arranged in radial alignment with the at least one bore.

12. The external rotor device according to claim 1, wherein the at least one pocket encloses the at least one sensor magnet on at least four sides.

13. The external rotor device according to claim 12, wherein the at least one pocket encloses the at least one sensor magnet on five sides, wherein a sixth side is a side subsequently sealed after the at least one ring has been formed.

14. The external rotor device according to claim 1, wherein the rotor housing and/or the at least one ring are made of plastic material.

15. The external rotor device according to claim 1, wherein the at least one ring is materially bonded to the rotor housing without an additional material bonding component, wherein the at least one ring is materially bonded to the rotor housing by an original molding process from the following group: thermoset injection molding, elastomer injection molding, multi-component injection molding, in-mold injection molding, hot embossing or injection embossing or swelling flow embossing, powder injection molding, and extrusion injection molding.

16. A method of providing a sousing component in a form of a ring in an external rotor device, for providing a receiving cavity as a pocket for a sensor in a rotor housing of the external rotor device, the method comprising setting up the housing component for an initial molding process for a material-locking molding of the housing component on the rotor housing with the receiving cavity in a predefined relative position relative to the rotor housing, the housing component and the rotor housing having geometrically corresponding lateral surfaces with all of an inner circumferential surface of the housing component in contact with the outer circumferential surface of the rot housing, by means of which a fully circumferential material-locking interface is provided which has a maximum degree of mold separation of 0.1.

17. An external rotor device with a sensor integrated in a rotor housing, produced by forming a housing component in the form of a ring with at least one pocket for the sensor to the rotor housing and thereby forming an integral housing part at least from the rotor housing and the housing component, by connecting the housing component to an outer lateral surface of the rotor housing, with all of an inner circumferential surface of the housing component in contact with the outer circumferential surface of e rotor housing, by primary molding in the form of injection molding, wherein the housing component ring and the rotor housing have geometrically corresponding lateral surfaces by means of which a fully comprehensive material-locking interface is provided, which has a maximum degree of mold separation of 0.1.

18. The external rotor device according to claim 17, wherein the pocket is closed after insertion of the sensor or sensor magnet.

* * * * *

UNITED STATES PATENT AND TRADEMARK OFFICE
CERTIFICATE OF CORRECTION

PATENT NO. : 12,451,767 B2
APPLICATION NO. : 17/641934
DATED : October 21, 2025
INVENTOR(S) : Michael Kisch et al.

Page 1 of 1

It is certified that error appears in the above-identified patent and that said Letters Patent is hereby corrected as shown below:

In the Claims

Column 11, Line 24, Claim 16, delete "sousing" and insert -- housing --

Column 12, Line 6, Claim 16, delete "rot" and insert -- rotor --

Column 12, Line 19, Claim 17, delete "of e rotor" and insert -- of the rotor --

Column 12, Line 21, Claim 17, delete "ring and" and insert -- and --

Signed and Sealed this
Twenty-third Day of December, 2025

John A. Squires
*Director of the United States Patent and Trademark Office*